March 21, 1939.  B. DE H. MILLER  2,151,299
PROCESS AND APPARATUS FOR THE EXTRACTION OF HELIUM FROM GASEOUS MIXTURES
Filed May 28, 1937
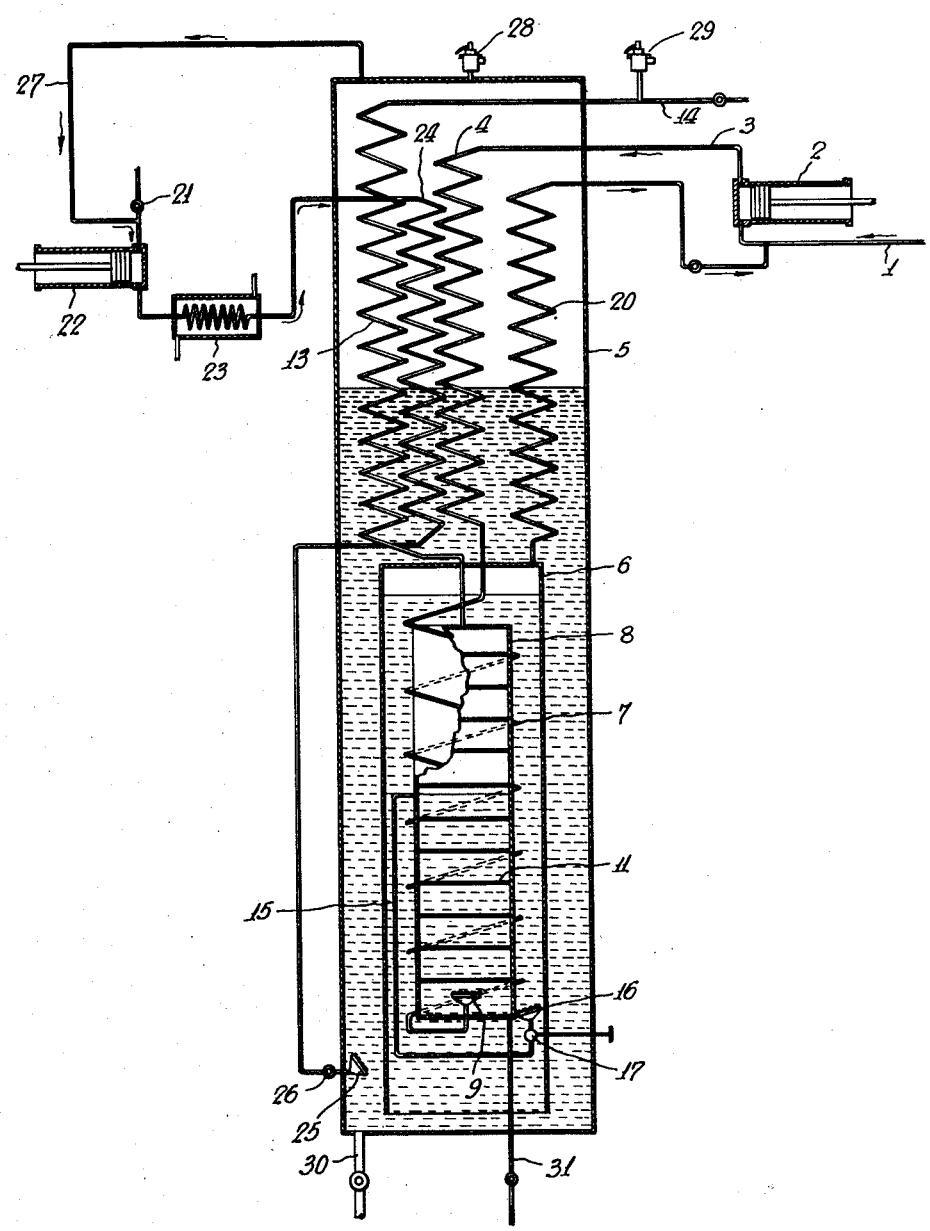
INVENTOR
*Bruce De Haven Miller*
BY
*Dean Fairbank & Hirsch*
ATTORNEYS Patented Mar. 21, 1939

2,151,299

UNITED STATES PATENT OFFICE 2,151,299

PROCESS AND APPARATUS FOR THE EXTRACTION OF HELIUM FROM GASEOUS MIXTURES

Bruce De Haven Miller, Louisville, Ky., assignor, by mesne assignments, to United States of America, as represented by Secretary of Interior Application May 28, 1937, Serial No. 145,222

13 Claims. (Cl. 62—175.5)

Although the present invention is concerned primarily in the separation and purification of helium, the invention is also applicable in connection with the separation of other gases particularly where the gas to be separated has a considerably lower boiling point than those of the other constituents of the gaseous mixture, whereby such other constituents may be liquefied in the process and at a temperature above the liquefying point of the gas to be extracted and purified.

In the separation of a low boiling point gas from a mixture of other gases having higher boiling points, it is common to employ a liquefaction method with either fractional condensation or fractional distillation. The methods of separation now in general use have been found to have certain limitations as to efficiency. When the gas to be extracted in a substantially pure state constitutes only a small percentage of the gas mixture, and when a small percentage of impurity in the extracted gas is highly objectionable, expensive equipment and careful control are ordinarily required.

The present invention relates to the type of liquefaction process in which the readily liquefiable constituents of the gas are liquefied under high pressure and in heat interchanging relationship with a bath of liquefied gas having a boiling point above that of the helium or other gas to be obtained from the mixture and which is drawn off without having been liquefied.

So far as many features of the present invention are concerned it constitutes an improvement upon the process disclosed and claimed in the Bottoms Patent 1,881,105 issued October 4, 1932.

By reason of the present improvement the separation of the gases is efficiently effected within wide permissible limits, and also the gases are efficiently and economically purified to within a range approximating the maximum possible recovery.

As one important feature of the invention a quantity of the liquefied portion of the gaseous mixture is maintained in a separation chamber under high pressure, and the gas mixture, after being partially liquefied by the action of pressure and a low temperature, is delivered to said chamber at the bottom thereof so that the unliquefied portion bubbles up through the liquid, is purified thereby, and escapes at the top and above the liquid level while still under high pressure.

As another important feature of the invention a liquid bath under lower pressure surrounds the high pressure chamber within which separation takes place, and which acts to partially liquefy the gas delivered under high pressure to the bottom of the chamber.

As a further feature this bath is maintained by the direct delivery and expansion of the high pressure liquid from the chamber to the lower portion of the bath, whereby the portion of the gas of lowest boiling point which may be dissolved in the liquid escapes through the liquid bath to agitate the latter, cause more effective heat interchange and become purified.

As a further feature of my invention a second or outer liquid bath of any suitable gas or gaseous mixture is maintained and which serves not only to prevent undue evaporation in the first mentioned bath but also to partially fill the heat interchanger through which the gases are received and delivered.

As a further feature, the liquid in said outer bath is agitated by the delivery of liquefied or partially liquefied gas to an expansion nozzle delivering into the bath adjacent to the bottom thereof, whereby more effective heat interchange with the liquid in the first mentioned bath is obtained and a lower temperature maintained.

Various other important features and advantages will be pointed out in the following description or will be apparent therefrom and from the accompanying drawing.

In the accompanying drawing the single figure is a diagrammatic central section through an apparatus embodying my invention.

As previously noted the invention, although particularly useful in the purification of a helium gas mixture, may be used for the separation of other gases as well as for the purification of other gases, but to simplify the description of the process and apparatus I will designate as helium the low boiling point constituent of the mixture and which is to be recovered in a substantially pure state.

In carrying out my invention for the separation and purification of helium, and by the use of the apparatus shown in the accompanying drawing, a gas mixture including helium is first treated in any suitable manner to remove any carbon dioxid and water vapor, dust or other constituents which may be present and which might tend to clog the apparatus or interfere with its desired operation. The gas mixture so purified is delivered through a pipe 1 to a compressor 2 which may put the gas under a high pressure, for example in the order of 2000 pounds gauge pressure, and deliver it through a pipe 3 and heat exchange coil 4 contained in a chamber 5. The chamber 5 is normally partially filled with a liquefied gas under low pressure, and in the lower portion of the chamber there is a bell 6 enclosing a high pressure separating chamber 8, so that there is in effect two liquid baths, one inside the bell and the other outside of it, although the two baths may communicate with each other at the lower portion of the chamber 5 and beneath the lower edge of the bell 6.

It is not essential that the member 6 be in the form of a bell as it may be a closed casing encircling the chamber 8 and encircled by the casing of the chamber 5.

The coil 4 has its lower portion immersed in the liquid of the chamber 5 and is directly connected to a second coil 7 in the chamber 8, the coils 4 and 7 in effect forming a single continuous coil. The lower end of the coil 7 leads through the wall of the inner high pressure chamber 8 and terminates in a diffusing member 9 through which the mixture delivered by the compressor through the coils 4 and 7 escapes into the lower portion of the liquid in the high pressure chamber 8. The gas under high pressure will in part liquefy in the lower portion of the coil 4, and the liquefaction of the more easily liquefiable constituents, the recovery of which is not desired, will be substantially complete by the time the mixture reaches the diffusion means 9 and passes into the high pressure chamber 8. The mixture of liquefied gas and the non-liquefied low boiling point gas will separate in the high pressure chamber 8. If desired suitable screens 11 may be mounted in spaced superposed relationship in the chamber 8 so as to cause a washing of the helium as it passes up through the liquid in the lower portion of the chamber 8 and a condensing of any liquid carried up by the helium in the upper portion of the chamber 8. As a result the gas which collects in the upper part of the chamber 8 is substantially free of admixture with any other gas and may be drawn off through a coil 13 immersed in the liquid of the chamber 8 and in heat exchange relationship to the incoming gas in the coil 4. This uncontaminated helium may be delivered through the pipe 14 to any suitable reservoir which may take the gas at the pressure created by the compressor 2 and maintained in the chamber 8.

The liquid in the chamber 8 is maintained at a predetermined level which may be approximately midway of the height of the chamber 8, and as the liquid accumulates to this level it may overflow through a pipe 15 leading downwardly to an expansion valve 17 and a diffusing member 16 outside of the chamber 8, but within the chamber or bell 6. The valve 17 permits an expansion to lower pressure and the formation of some gas which bubbles up through the liquid between the walls of the chambers 6 and 8. This causes an agitation of the liquid bath and sweeps off any bubbles which might accumulate on the outer surface of the wall of the chamber 8, so that a very much more effective heat interchange is secured. Furthermore the agitation and the bubbling of the gas through the liquid tends to cause a further separation and purification, so that substantially all of the helium which was dissolved in the liquid under high pressure in the lower portion of the chamber 8 will escape from the liquid in the chamber 6, leaving the residual liquid substantially free of helium.

The gas which collects in the upper portion of the chamber or bell 6 is drawn off through a coil 20, leading through the upper portion of the bath in the chamber 5 and in heat interchanging relationship to the incoming gas in the coil 4 and is delivered to the intake of the compressor 2 or returned to the source of helium gas mixture which is to be treated.

The rate at which the gas is permitted to escape through the coil 20 may be controlled so that there will be maintained at all times a gas space in the upper part of the chamber 6, so that liquid cannot enter the coil 20, but the liquid level in the chamber 6 should be above the upper end of the high pressure chamber 8.

The pressure which is maintained in the chamber 6 may be substantially atmospheric pressure, so that the temperature of the liquid bath will be very low, but if the chamber 6 be in the form of a bell and liquid be maintained in the chamber 5 at a higher level than in the chamber 6 the pressure in the upper end of the chamber 6 and in the coil 20 will obviously be slightly above atmospheric.

The decrease in pressure from in the range of 2000 pounds gauge pressure to atmospheric pressure at the valve 17 will abstract the heat in accordance with the well known Joule-Thompson effect and cause the maintenance of the desired quantity of liquid and the desired low temperature.

The delivery of the mixed gas and liquid from the diffuser 9 into the bottom of the chamber 8 below the liquid level thereof, and the delivery of the overflowing liquid through the expansion valve 17 to the diffuser 16 near the bottom of the liquid bath in the chamber 6, constitute important features of my invention and result in the increase in the coefficient of heat transfer, the washing and purifying of the helium, and the maintenance of the desired low temperature of the bath in the chamber 6.

The intermixing of the liquid by the action of the incoming gas at the lower portion of the liquid serves to inhibit any tendency toward selective distillation of any constituents of the bath, but facilitates the escape of the helium, and as a result the temperature of the liquid bath in the chamber 6 approximates that of the boiling point of the aggregate constituents rather than that of the highest boiling point constituent.

As a feature of the present invention a second liquid bath is maintained and preferably the two baths are in open communication with each other adjacent to their lower ends.

As shown there is provided a compressor 22 which may take air from the atmosphere or nitrogen from a suitable source through the valve 21. The compressed air is cooled to remove the heat of compression, and preferably to further cool it in a coil in the cooling chamber 23. The cooled compressed air is delivered through the coil 24 in the heat interchanger constituting the upper portion of the casing 5 and is thence expanded through a valve 26 and delivered through a diffuser 25 into the lower portion of the casing 8 and below the liquid level in the latter and outside of the inner casing or bell 6.

The operation is maintained so that the refrigerating effect produced by the expansion permits the accumulation of liquid in the outer casing to a point preferably considerably above the inner casing 6, and the gas which is not liquefied or which evaporates from the accumulated liquid is drawn off at the top through the pipe 27 and returned to the compressor 22. Both the upper end of the casing 5 and the outlet pipe 14 for the separated helium may be provided with safety valves 28 and 29.

As the liquid in the outer bath is continuously agitated by the delivery and expansion of the compressed air below the liquid level, effective heat interchange with the contents of the inner chamber is maintained, and the composition of the outer bath is maintained substantially uniform.

In certain prior constructions the method of preparing and applying the refrigerating liquid bath often results in the collection of fractionally distilled liquids, and the temperature of such bath is approximately that of the chief highest boiling liquid in the mixture, where as by the arrangement shown in the accompanying drawing the temperature of the bath is that of the aggregate constituents of the liquid. For example, in a structure such as shown in the Bottoms Patent 1,850,529, if air be employed as the refrigerant gas mixture, the temperature existing in the liquid bath around the coil 6 of that patent at atmospheric pressure would be substantially that of liquid oxygen, namely, −183° C., whereas in the present invention where the residual liquid is introduced beneath the surface of the liquid bath and an intimate mixing occurs such temperature approximates that of the liquid air itself, namely, −194.2° C. Thus by introducing the residual liquid of the mixture which is formed, into the liquid bath and intimately mixing the liquids, an increased refrigerating temperature differential of approximately 11° C. can be made available over that obtained when the vaporization of the residual liquid is initiated outside of the bath by delivering the liquid to the chamber at a point above the normal liquid level.

Furthermore the presence of the portion of unliquefied gas, in the present case helium, within the liquid provides a low vapor pressure upon the boiling liquid when separation of liquid and gas occurs and enhances the heat transfer effect. Since helium gas possesses a low specific gravity and is at approximately atmospheric pressure in the top of the chamber 6, it will exert a low vapor pressure upon the liquid and thus lower the boiling temperature of the bath and enhance the heat exchange.

Upon being relieved from high pressure, the helium which may have been held in solution in the liquefied gas rises to the top of chamber 6 whence it passes through coil 20 back to the gas mixture inlet. In this way no portion of the valuable gas is lost and efficient recovery of all helium entering through the line 1 is secured.

The present process is a continuous one with an ample volume of heat exchange mediums.

The separate refrigerating gas cycle through the compressor 22, cooler 23, coil 24, valve 26, the outer liquid bath and the return pipe 27 is preferably a binary mixture of gases, such as atmospheric air. The gases with which the helium is normally associated usually include nitrogen as a constituent.

To start the process in operation atmospheric air or nitrogen is delivered to the compressor 22 and compressed to a suitable high pressure preferably in the order of 2000 pounds gauge, and after passing through the cooler 23 is led through the heat exchange coil 24 into the chamber 5. Simultaneously a volume of air may be introduced through the pipe 1, and after compression be led through the coils 4 and 7. By expansion through valve 17 this highly compressed gas will partially liquefy and form the initial liquid bath in the high pressure chamber 8, and at the same time highly compressed gas expanded from the valve 26 will form the initial liquid bath in the bottom of chamber 5. Vaporized and distilled gases resulting from these liquid baths will rise through the heat exchanger and contact its coils, and thus tend to further cool the gases entering from the two compressors. When the liquid baths in chambers 5 and 8 have been built up to the requisite height, the inlet pipe 1 may be connected to receive the gas mixture from which the helium or other relatively non-liquefiable gas is to be separated, and the valve 17 may be opened to provide an exit for the liquid collecting in the high pressure chamber 8.

During the early stages of operation the gas delivered through pipe 14 will not be completely separated from the mixture since it takes time to collect the liquid refrigerating bath and to establish the proper balance of temperatures, pressures, valve settings, liquid levels and intakes and outputs from the system. However, a relatively short time and relatively few adjustments of the apparatus are required in order to establish the continuous process.

Any suitable and conventional automatic control equipment may be employed for adjusting the valves, compressors and the like without departing from the scope of the invention.

As previously noted the chamber 6 may be open at the bottom so as to communicate with the chamber 5. The liquid bath surrounding the chamber 8 thus forms an integral part of the liquid bath surrounding the chamber 6, and free movement of the entire mixed liquids is thus made possible. As is obvious, the liquid levels within the apparatus may be varied depending upon the desired pressure conditions, but in general it is preferable that the cold liquid bath will surround the entire chambers 8 and 6 as well as the lower portions of the coils 4, 13, 20 and 24. The liquid level in the chamber 8 is determined by the location of the inlet to the pipe 15, and the liquid level in the chamber 6 is determined by the back pressure maintained in the coil 20. The coils 4, 13, 20 and 24 are cooled in their lower portions by the bath of liquid in the chamber 5 and in their upper portions by the gas rising from the liquid in said chamber.

The low temperature of the gas going out through the coils 20 and 13 also aids in cooling the incoming gas in the coils 4 and 24, and these coils may be intimately associated with or in more effective heat transfer relationship than is indicated in the diagrammatic drawing.

After the process has once been started the valve 21 may serve to bleed excess gases from the system in order to care for the continuous input of the gases mixed with the helium and delivered through the pipe 1.

It is preferable that the liquid chambers be provided with suitable valve controlled drains, such as 30 and 31, and obviously the entire column should be provided with suitable insulation, such as is employed in commercial gas liquefying systems.

The diffusing members 9, 16 and 25, all of which are located below the liquid level of the chambers in which they are mounted, are preferably so positioned as to direct turbulent mixed liquids most effectively along the heat exchange surfaces.

Having thus described my invention, what I claim as new and desire to secure by Letters Patent is:

1. The method of separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, withdrawing the helium at high pressure from above said liquid level, maintaining a liquid bath at low pressure around said chamber, and preventing selective distillation of the liquid in said lower pressure bath by delivering liquid from said chamber to said lower pressure liquid bath adjacent to the lower portion of the latter to agitate the liquid thereof.

2. The method of separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, and with a substantially constant liquid level, withdrawing the helium at high pressure from above said liquid level, maintaining a liquid bath at low pressure around said chamber, and preventing selective distillation of the liquid in said lower pressure bath by delivering liquid from said chamber at said liquid level to said lower pressure liquid bath adjacent to the lower portion of the latter to agitate the liquid thereof.

3. The method separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, withdrawing the helium at high pressure from above said liquid level, maintaining a liquid bath at low pressure around said chamber, preventing selective distillation of the liquid in said lower pressure bath by delivering liquid from said chamber to said lower pressure liquid bath adjacent to the lower portion of the latter to agitate the liquid thereof, withdrawing helium gas mixture separating from the top of the liquid bath, and returning it for recompression and reliquefaction with said first mentioned mixture.

4. The method of separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, withdrawing the helium at high pressure from above said liquid level, maintaining a liquid bath at low pressure around said chamber, preventing selective distillation of the liquid in said lower pressure bath by delivering liquid from said chamber to said lower pressure liquid bath adjacent to the lower portion of the latter to agitate the liquid thereof, and maintaining a second liquefied gas bath around said first mentioned bath.

5. The method of separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, withdrawing the helium at high pressure from above said liquid level, maintaining a liquid bath at low pressure around said chamber, preventing selective distillation of the liquid in said lower pressure bath by delivering liquid from said chamber to said lower pressure liquid bath adjacent to the lower portion of the latter to agitate the liquid thereof, and maintaining a second liquefied gas bath around said first mentioned bath, said baths being in open communication at their lower portions and under approximately the same pressure.

6. The method of separating helium from a gaseous mixture containing the same, which includes compressing said mixture, liquefying the undesired liquefiable portions of the gaseous mixture and forming therewith a liquid bath, maintaining a body of said liquid in a separating chamber under high pressure, withdrawing the helium at high pressure from above said liquid level, maintaining a liquid bath at low pressure around said chamber, preventing selective distillation of the liquid in said lower pressure bath by delivering liquid from said chamber to said lower pressure liquid bath adjacent to the lower portion of the latter to agitate the liquid thereof, maintaining a second liquefied gas bath around said first mentioned bath, compressing a second gaseous mixture, and expanding it at low pressure into the lower portion of said second bath.

7. An apparatus for separating helium from a gaseous mixture and purifying it, including a high pressure separating chamber, a liquid bath chamber surrounding said first chamber, a conduit for the compressed mixture leading through said second chamber to the bottom of said first chamber, a liquid overflow pipe leading from said first chamber intermediate of the upper and lower ends thereof to said bath chamber adjacent to the bottom of the latter and having an expansion nozzle, and an outlet for the separated helium leading from the upper part of said separating chamber.

8. An apparatus for separating helium from a gaseous mixture and purifying it, including a high pressure separating chamber, a liquid bath chamber surrounding said first chamber, a conduit for the compressed mixture leading through said second chamber to the bottom of said first chamber, a liquid overflow pipe leading from said first chamber intermediate of the upper and lower ends thereof to said bath chamber adjacent to the bottom of the latter and having an expansion nozzle, a diffuser directed toward the outer surface of said first mentioned chamber, and an outlet for the separated helium leading from the upper part of said separating chamber.

9. An apparatus for separating helium from a gaseous mixture and purifying it, including a high pressure separating chamber, a liquid bath chamber surrounding said first chamber, a conduit for the compressed mixture leading through said second chamber to the bottom of said first chamber, a liquid overflow pipe leading from said first chamber intermediate of the upper and lower ends thereof to said bath chamber adjacent to the bottom of the latter and having an expansion nozzle, an outlet for the separated helium leading from the upper part of said separating chamber, a second liquid bath chamber surrounding said first mentioned bath chamber, and means for delivering and expanding a second compressed gas into the lower portion of said second bath chamber.

10. An apparatus for separating helium from a gaseous mixture and purifying it, including a high pressure separating chamber, a liquid bath chamber surrounding said first chamber, a conduit for the compressed mixture leading through said second chamber to the bottom of said first chamber, a liquid overflow pipe leading from said first chamber intermediate of the upper and lower ends thereof to said bath chamber adjacent to the bottom of the latter and having an expansion nozzle, an outlet for the separated helium leading from the upper part of said separating chamber, and means for compressing and reliquefying the gas escaping from said bath chamber and returning it to the lower portion of said separation chamber.

11. An apparatus for separating helium from a gaseous mixture and purifying it, including a high pressure separating chamber, a liquid bath chamber surrounding said first chamber, a conduit for the compressed mixture leading through said second chamber to the bottom of said first chamber, a liquid overflow pipe leading from said first chamber intermediate of the upper and lower ends thereof to said bath chamber adjacent to the bottom of the latter and having an expansion nozzle, an outlet for the separated helium leading from the upper part of said separating chamber, a second liquid bath chamber surrounding said first mentioned bath chamber, and means for delivering and expanding a second compressed gas into the lower portion of said second bath chamber, said two bath chambers being in open communication with each other at their lower ends.

12. An apparatus for separating helium from a gaseous mixture, including a high pressure separation chamber, two concentric bath chambers surrounding said separation chamber, a conduit leading through the inner bath to the bottom of the separation chamber, a pipe leading from the separation chamber intermediate of the height of the latter to the lower portion of the inner bath chamber and having an expansion nozzle, a conduit leading through the outer bath chamber to the lower portion of the latter and having an expansion chamber, means for supplying a gas mixture under pressure to the first conduit, means for supplying a gas under pressure to the third conduit, an outlet conduit for helium from the top of the separation chamber, an outlet conduit for gas from the top of the inner bath to said first means, and an outlet conduit for said outer bath to said second means.

13. An apparatus for separating helium from a gaseous mixture, including a high pressure separation chamber, two concentric bath chambers surrounding said separation chamber, a conduit leading through the inner bath to the bottom of the separation chamber, a pipe leading from the separation chamber intermediate of the height of the latter to the lower portion of the inner bath chamber and having an expansion nozzle, a conduit leading through the outer bath chamber to the lower portion of the latter and having an expansion chamber, means for supplying a gas mixture under pressure to the first conduit, means for supplying a gas under pressure to the third conduit, an outlet conduit for helium from the top of the separation chamber, an outlet conduit for gas from the top of the inner bath to said first means, and an outlet conduit for said outer bath to said second means, all of said conduits being juxtaposed to form a heat interchanger, and said bath chambers being in open communication with each other at their lower ends.

BRUCE DE HAVEN MILLER.